Jan. 10, 1950 R. H. STILLER 2,494,110
TRAILER MOUNTED BOAT SUPPORT
Filed Oct. 8, 1947

INVENTOR
Rudolf H. Stiller
BY Popp and Popp
ATTORNEYS.

Patented Jan. 10, 1950

2,494,110

UNITED STATES PATENT OFFICE 2,494,110

TRAILER MOUNTED BOAT SUPPORT

Rudolf H. Stiller, Derby, N. Y.

Application October 8, 1947, Serial No. 778,644

2 Claims. (Cl. 214—65)

This invention relates to a device for moving a load supporting member relative to a stationary support, and more particularly to a device for elevating and lowering one end of a load carrying sling suspended from supports on a highway trailer.

This invention constitutes an improvement on the sling assembly shown and described in the construction of boat trailer disclosed in the pending application for United States patent of John L. Schmitt, Serial No. 702,192, filed October 9, 1946, now abandoned, for Convertible trailer. As there shown and described, the rear of a boat is suspended in a pendulant manner from the upper ends of supports or uprights carried by the trailer frame, the ends of the sling being adjustable to raise or lower the boat relative to the trailer frame. It is desirable to carry the boat in such a free pendulant manner during travel to prevent the boat from striking the trailer frame and thereby avoid damage to the boat. However, in loading the boat onto the trailer the keel of the boat is generally rolled on a roller carried by the trailer frame until the boat is in proper fore and aft position on the trailer and thereafter the sling is adjusted to lift the rear of the boat off the roller.

The object of the invention is to provide a manually operable device for lifting and lowering the ends of the boat carrying sling relative to the supports on the trailer from which the sling is suspended, the device being simple in construction, quickly operable in either direction to raise or lower the sling, and when in the traveling position cannot be released to drop the boat.

Other objects and advantages of the invention will be apparent from the following description and drawing in which.

Figure 1:
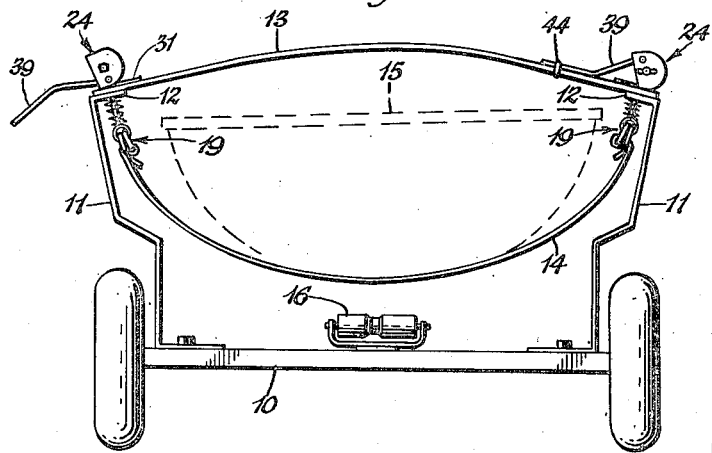
Fig. 1 is a rear elevation of a boat trailer embodying the present invention.

The trailer illustrated in Fig. 1 is shown as having a wheeled axle 10 carrying a pair of spaced uprights 11, the upper end 12 of each of which extends inwardly and slightly upwardly, and a tie down bar 13 supported on the upper ends 12 and connecting the uprights 11 together to increase the stability thereof. A sling 14 is shown as suspended from the upper ends 12 of the uprights 11 and supporting a boat 15 indicated by broken lines. The axle 10 is shown as carrying a grooved roller 16 on which the boat is rolled during loading the boat on the trailer. While the boat is thus being rolled on the roller 16, the sling 14 is loose so that it hangs below the roller. After the boat is in proper fore and aft position on the trailer, the sling is adjusted so that the boat is lifted off the roller and the boat carried in a freely suspended manner during travel.

Figure 2:
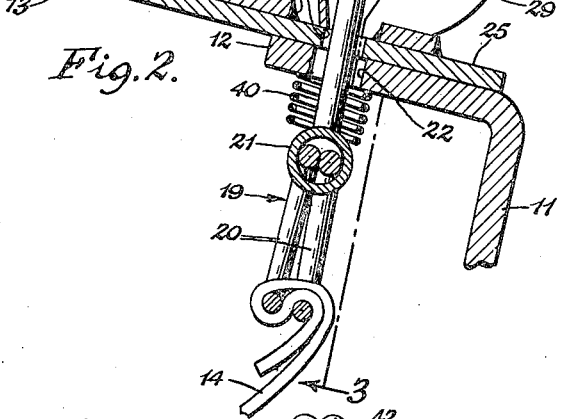
Fig. 2 is a vertical central fragmentary sectional view on an enlarged scale, through the upper right hand portion of the trailer shown in Fig. 1 and showing the device forming the subject of the present invention.

The present invention is directed toward providing means for quickly and easily raising and lowering one end of the sling 14 relative to the corresponding upper end 12 of one of the uprights 11. To this end, each end of the sling 14 is shown as being connected to the lower end of a rigid member or rod 18 by means of an adjustable buckle 19. This buckle 19 is shown as consisting of two similar rectangular loops 20 made of metal rod, the upper corresponding sides of these loops 20 passing through a tube or sleeve 21. This tube or sleeve 21 is shown as being welded to the lower end of the rigid member or rod 18. As shown in Fig. 2, the end of the sling 14 passes along the outside of the lower side of the outer loop 19, thence inwardly over the lower sides of both inner and outer loops, thence under the lower side of the main loop, thence upwardly between the loops, and thence over and around the lower side of the outer loop and under the portion of the sling embracing the outer loop. In this manner it will be seen that the end of the sling 14 can be adjusted to determine the effective length of the sling and will not slip in any adjustment. Of course, any other suitable type of buckle can be employed. The buckle 19 or its equivalent may be omitted, if desired, in which case the end of the sling is connected directly to the lower end of the rigid member or rod 18.

Figure 3:
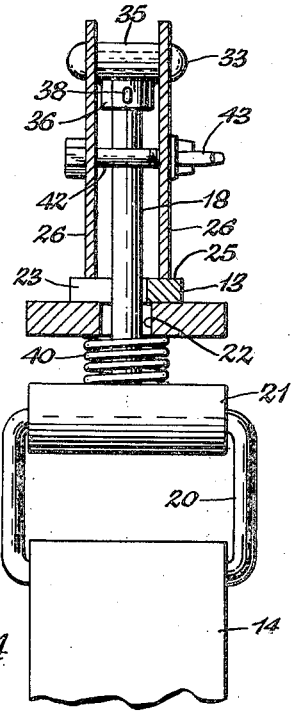
Figs. 3 and 4 are sectional views thereof taken on the respectively numbered lines in Fig. 2.
Figure 4:
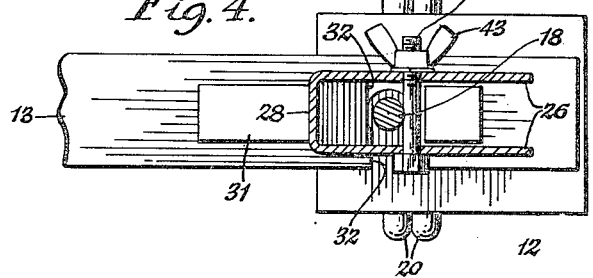

The rigid member or rod 18 extends upwardly through an opening 22 provided in the upper end 12 of the upright 11 and also extends through a slot 23 provided in the corresponding end of the tie down bar 13. The opening 22 and slot 23 are of sufficient size to permit of slight changes in the inclination of the rod 18 and also to permit this rod 18 to be substantially rectilinearly movable through the opening 22 and slot 23. The slot 23 is shown in Figs. 3 and 4 as opening to one longitudinal side of the tie down bar 13 so that this bar can be readily removed or mounted in place on the upper ends 12 of the uprights 11.

Figure 5:
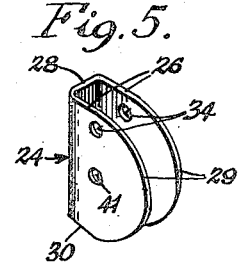
Fig. 5 is a perspective view, on a reduced scale, of the cam member shown in Figs. 1–4.

The upper end of the rigid member or rod 18 is shown as being pivotally connected to a manually operable cam member 24 which works on a flat upper surface 25 provided on the corresponding end of the tie down bar 13. The cam member 24 is U-shaped in cross section, as shown in Figs. 4 and 5, and is shown as being formed from one piece of sheet metal to provide a pair of spaced flat parallel sides or plates 26 connected together along corresponding edges by an intermediate part or plate 28. Each of the sides or plates 26 of the cam member 24 is provided with a cam surface which includes a curved, arcuate or semi-circular portion 29 terminating at one end in a chordant flat portion 30. These cam surfaces of each cam member 24 engage the flat upper surface 25 on the corresponding end of the tie down bar 13.

To prevent displacement of the tie down bar 13 from its operative position on the upper ends 12 of the uprights, each end of the tie down bar 13 is shown as having welded to the upper side thereof an upwardly projecting rib 31 which is of a width slightly less than the distance between the inner opposing faces of the sides 26 of the cam member 24. This rib 31 is arranged between the sides 26 of the cam member 24 and guides the cam member in its movement and at the same time prevents the tie down bar 13 from being displaced from the support ends 12 of the uprights 11. At 32 the rib 31 is shown as being interrupted adjacent the slot 23 to accommodate the lower end of the intermediate part of plate 28 of the cam member, as shown in Fig. 2. However, if desired this lower end of the intermediate part or plate 28 can be recessed so as to fit over the rib 31 which may then be continued across the interruption 32 except for the provision of an opening (not shown) in the rib 31 to accommodate the rigid member or rod 18.

Means are provided for pivotally connecting the upper end of the rigid member or rod 18 to the cam member 24 at a point remote from the chordant flat portions 30 and adjacent the opposite end of the semi-circular portions 29 of the cam surfaces of the cam member whereby the cam member is rotatable or movable on the rigid member or rod 18 about an axis arranged eccentric to the semi-circular portions 29 thereof. As shown, such means comprise a pivot pin 33 arranged in registered holes 34 provided in the sides 26 of the cam member 24, a sleeve 35 surrounding the pivot pin 33 and arranged between the sides 26, and a nut 36 welded to one side of the sleeve 35 and receiving the threaded upper end of the rigid member or rod 18. Referring to Fig. 2, a cotter pin 38 is shown as arranged in registered holes provided in the nut 36 and a rod 18 to prevent loosening of the threaded connection.

A handle 39 is shown as welded to the upper part of the intermediate part or plate 28 of the cam member 24 and projecting generally perpendicularly therefrom for manually turning the cam member 24 about the axis of its pivotal mounting on the upper end of the rigid member or rod 18.

Spring means are preferably operatively interposed between the cam member 24 and rigid member or rod 18 to constantly urge the cam surfaces of the cam member 24 into engagement with the flat upper surface 25 of the tie down bar 13. For this purpose, a helical compression spring 40 is shown as arranged on the lower end of the rod 18 with the upper end of the spring bearing against the underside of the support end 12 of the upright 11 and with its lower end bearing against the tube or sleeve 21.

Means are provided for preventing rotation of the cam member 24 in either direction about the axis of the pivot pin 33 when the chordant flat portions 30 of the cam member engage the flat upper surface 25 of the tie down bar 13 thereby to prevent lowering or further raising of the end of the sling 14. For this purpose, the sides 26 of the cam member 24 are provided with registered holes 41 which are arranged immediately to the right of the rigid member or rod 18 as viewed in Fig. 2 when the cam member 24 has its chordant flat portions 30 resting on the flat upper surface 25 of the tie down bar 13 so that a bolt 42 can be inserted in these holes 41, a wing nut 43 being screwed on one end of the bolt 42, as best shown in Figs. 2, 3 and 4. It will thus be seen that the cam member 24 is restrained against further rotation about the axis of the pivot pin 33 in a clockwise direction as viewed in Fig. 2. It is also preferred to prevent counterclockwise movement of the cam member and for this purpose a strap, ring or other retaining device 44 secures the handle 39 to the tie down bar 13.

Assuming the boat is resting on the roller 16 with the loosened sling passing under the rear part thereof, the tie down bar is placed on the support ends 12 of the uprights 11, this being accomplished by lifting each cam member 24 high enough above the corresponding support end so that the corresponding end of the tie down bar 13 can be slid in position on the upright with the slot 23 in the tie down bar receiving the corresponding rod 18. The cam member 24 is then lowered so that the sides 26 thereof straddle the corresponding rib 31. It will be noted that in placing the tie down bar 13 in position on the uprights 11, each of the cam members 24 must be in a position where the curved portion 29 adjacent the holes 34 of the cam member is in engagement with the flat upper surface 25 of the corresponding end of the tie down bar, as shown at the upper left of Fig. 1.

Thereafter the initial slack in the sling 14 is taken up by adjusting the buckle 19 at each end of the sling, this making the sling taut with the boat still resting on the roller 16. The handle 39 of each cam member 24 is then moved so as to rotate the corresponding cam member about the axis of its pivot pin 33. During such rotation of each of the cam members 24, the cam surfaces thereof remain in engagement with the flat upper portion 25 of the corresponding end of the tie down bar because of the load placed on the cam member through its rigid member or rod 18 and also because of the urging of its compression spring 40, this spring being preferably not only under an initial compression but being further compressed by the movement of its companion cam member. As each of the cam members 24 is being so rotated, it will be noted that the semi-circular portions 29 ride on the corresponding flat upper surface 25 of the tie down bar 13 causing the axis of the corresponding pivot pin 33 to move upwardly and thus shift or move the corresponding rigid member or rod 18 rectilinearly through the corresponding opening 22 and slot 23 in a direction transverse of the corresponding support end 12 and end of the tie down bar 13. Obviously there will be slight angular changes in the position of the rigid member or rod 18 as the cam member 24 is rotated and these are accommodated by the oversize opening 22 and slot 23 but the movement of the rigid member or rod 18 is substantially rectilinear. In this connection it will be noted that each cam member 24 rotates about an axis which is substantially fixed against movement in a direction parallel to the corresponding flat surface 25.

Rotation of each cam member 24 is continued until the chordant flat portions 30 of its cam surfaces engage the corresponding flat surface 25. In transferring from the semi-circular portions 29 to the chordant flat surfaces 30 there will be a slight lowering of the axis of the corresponding pivot pin 33 relative to the corresponding flat surface 25 and consequently a slight reverse rectilinear movement of the corresponding rigid member or rod 18. However, this is slight and makes for stability of each cam member 24. During this final part of the rotation of each cam member 24, the lower part of its intermediate part or plate 28 is accommodated in the interruption or recess 32 in the corresponding guide rib 31. In this manner, each end of the sling 14 is raised quickly and easily.

To insure the chordant flat portions 30 of each cam member 24 remaining in engagement with the corresponding flat surface 25 and thereby prevent rotation of the cam member in either direction, the bolt 42 is inserted in the holes 41 and the wing nut 43 applied on the end of the bolt 42. Also, the ring, strap or other retaining device 44 is applied to the end of the handle 39 to secure the same to the tie down bar 13. The trailer is then ready for travel.

In removing or unloading the boat 15 from the trailer, the reverse of the procedure described above is followed:

From the foregoing it will be seen that the present invention provides a simple, easily manually operated lifting device for the purpose described which is inexpensive to manufacture and not likely to get out of order or require repair, and which also will not fail or become dislodged during travel.

While the subject matter of the invention has been described particularly in connection with a boat trailer having a sling for supporting a boat, it will be understood that the invention can be employed for moving any type of flexible load supporting member relative to a stationary support.

I claim:

1. In a trailer including a pair of spaced uprights having support ends, a tie down bar arranged on said support ends, a load carrying sling suspended from said support ends, the combination therewith of means for raising and lowering one end of said sling relative to its companion one of said support ends, comprising a manually movable U-shaped cam member having two spaced parallel sides arranged above said companion one of said support ends, each of said sides having a cam surface engaging a flat upper surface provided on said tie down bar, an upwardly projecting guide rib on said tie down bar and arranged between said sides, each of said cam surfaces including a semi-circular portion terminating at one end in a chordant flat portion, a rod arranged in an opening provided in said companion one of said support ends and in a slot provided in said tie down bar and extending through said opening and slot and being substantially rectilinearly movable in a direction transverse of said support surface, said slot opening to one edge of said tie down bar, the lower end of said rod being connected to said one end of said sling, the other end of said rod being arranged between said sides of said cam member and being pivotally connected thereto at a point remote from said chordant flat portions and adjacent the other end of said semi-circular portions whereby said cam member is rotatable on said rod about an axis arranged eccentric to said semi-circular portions thereof, rotation of said cam member about said axis with said semi-circular portions engaging said flat surface on said tie down bar effecting such rectilinear movement of said rod and engagement of said flat portions with said flat surface tending to prevent movement of said cam member, and a compression spring surrounding said rod and operatively arranged between said rod and said companion one of said support ends to constantly urge said cam surfaces into engagement with said flat surface on said tie down bar.

2. In a trailer including a pair of spaced uprights having support ends, a tie down bar arranged on said support ends, a load carrying sling suspended from said support ends, the combination therewith of means for raising and lowering one end of said sling relative to its companion one of said support ends, comprising a manually movable U-shaped cam member having two spaced parallel sides arranged above said companion one of said support ends, each of said sides having a cam surface engaging a flat upper surface provided on said tie down bar, an upwardly projecting guide rib on said tie down bar and arranged between said sides, each of said cam surfaces including a semi-circular portion terminating at one end in a chordant flat portion, a rod arranged in an opening provided in said companion one of said support ends and in a slot provided in said tie down bar and extending through said opening and slot and being substantially rectilinearly movable in a direction transverse of said support surface, said slot opening to one edge of said tie down bar, the lower end of said rod being connected to said one end of said sling, the other end of said rod being arranged between said sides of said cam member and being pivotally connected thereto at a point remote from said chordant flat portions and adjacent the other end of said semi-circular portions whereby said cam member is rotatable on said rod about an axis arranged eccentric to said semi-circular portions thereof, rotation of said cam member about said axis with said semi-circular portions engaging said flat surface on said tie down bar effecting such rectilinear movement of said rod and engagement of said flat portions with said flat surface tending to prevent movement of said cam member, and means adapted to lock said cam member against rotation relative to said rod when said flat portions are in engagement with said flat surface on said tie down bar.

RUDOLF H. STILLER.

REFERENCES CITED

The following references are of record in the file of this patent:

UNITED STATES PATENTS

| Number | Name | Date |
| --- | --- | --- |
| 1,379,162 | Brown | May 24, 1921 |
| 2,242,511 | Cook | May 20, 1941 |
| 2,260,676 | Lafaye, Sr. | Oct. 28, 1941 |
| 2,405,251 | Glaze | Aug. 6, 1946 |
| 2,442,994 | Clary | June 8, 1948 |